US011330063B2

(12) United States Patent
Baek et al.

(10) Patent No.: US 11,330,063 B2
(45) Date of Patent: May 10, 2022

(54) METHOD AND APPARATUS FOR SUPPORTING REAUTHENTICATION OF DN AUTHORIZED PDU SESSION AND MANAGING PDU SESSION ACCORDING TO CHANGE OF DN AUTHORIZATION DATA

(71) Applicant: Samsung Electronics Co., Ltd., Suwon-si (KR)

(72) Inventors: Youngkyo Baek, Suwon-si (KR); Sangjun Moon, Suwon-si (KR); Jicheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 92 days.

(21) Appl. No.: 16/784,882

(22) Filed: Feb. 7, 2020

(65) Prior Publication Data

US 2020/0267223 A1    Aug. 20, 2020

(30) Foreign Application Priority Data

Feb. 14, 2019    (KR) .................... 10-2019-0017175

(51) Int. Cl.
*H04W 56/00*    (2009.01)
*H04L 67/14*    (2022.01)
(Continued)

(52) U.S. Cl.
CPC .......... *H04L 67/14* (2013.01); *H04L 63/0892* (2013.01); *H04L 67/12* (2013.01);
(Continued)

(58) Field of Classification Search
CPC ..... H04L 67/14; H04L 63/0892; H04L 67/12; H04L 67/20; H04L 69/322; H04W 12/06
(Continued)

(56) References Cited

U.S. PATENT DOCUMENTS

2007/0117585 A1*   5/2007   Juneja ................... H04L 67/303
                                                  455/550.1
2017/0193277 A1    7/2017   Hong et al.
(Continued)

FOREIGN PATENT DOCUMENTS

KR    10-2017-0082681 A    7/2017
WO    2018/008980 A1    1/2018

OTHER PUBLICATIONS

3GPP; 3rd Generation Partnership Project; Technical Specification Group Services and System Aspects; System Architecture for the 5G System; Stage 2; (Release 15); 3GPP TS 23.501; V15.4.0; Dec. 2018; Valbonne, France.
(Continued)

*Primary Examiner* — Sai Ming Chan
(74) *Attorney, Agent, or Firm* — Jefferson IP Law, LLP

(57) ABSTRACT

The disclosure relates to a communication method and system for converging a 5th-Generation (5G) communication system for supporting higher data rates beyond a 4th-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. The disclosure provides a method for supporting re-authentication of a PDU session generated through DN authentication/authorization with a DN-AAA server, and a method and an
(Continued)

apparatus for managing a corresponding PDU session if DN authorization information is updated at the time of re-authentication.

22 Claims, 8 Drawing Sheets

(51) Int. Cl.
  *H04L 67/12* (2022.01)
  *H04L 67/53* (2022.01)
  *H04L 69/322* (2022.01)
  *H04L 29/06* (2006.01)
  *H04W 12/06* (2021.01)
(52) U.S. Cl.
  CPC ............ *H04L 67/20* (2013.01); *H04L 69/322* (2013.01); *H04W 12/06* (2013.01)
(58) Field of Classification Search
  USPC .......................................... 370/329
  See application file for complete search history.

(56) References Cited

U.S. PATENT DOCUMENTS

2019/0364541 A1    11/2019  Ryu
2020/0068391 A1*    2/2020  Liu ...................... H04L 63/162

OTHER PUBLICATIONS

Ericsson; 5GSM—EAP based secondary re-authentication; 3GPP TSG-CT WG1 Meeting #110; C1-182070 Apr. 16-20, 2018; Kunming (P. R. China).
3GPP; 3rd Generation Partnership Project; Technical Specification Group Services and System Aspects; Procedures for the 5G System; Stage 2; (Release 15); 3GPP TS 23.502; V15.4.1; Jan. 2019; Valbonne, France.
3GPP; 3rd Generation Partnership Project; Technical Specification Group Services and System Aspects; Policy and Charging Control Framework for the 5G System; Stage 2; (Release 15); 3GPP TS 23.503; V15.4.0; Dec. 2018 Valbonne, France.
International Search Report with Written Opinion dated May 15, 2020; International Appln. No. PCT/KR2020/001758.

* cited by examiner

METHOD AND APPARATUS FOR SUPPORTING REAUTHENTICATION OF DN AUTHORIZED PDU SESSION AND MANAGING PDU SESSION ACCORDING TO CHANGE OF DN AUTHORIZATION DATA

CROSS-REFERENCE TO RELATED APPLICATION(S)

This application is based on and claims priority under 35 U.S.C. § 119(a) of a Korean patent application number 10-2019-0017175, filed on Feb. 14, 2019, in the Korean Intellectual Property Office, the disclosure of which is incorporated by reference herein in its entirety.

BACKGROUND

1. Field

The disclosure relates to a method and an apparatus for supporting re-authentication of a protocol data unit (PDU) session generated through data network (DN) authentication/authorization with a data network-authentication, authorization, and accounting (DN-AAA) server in a 5th Generation (5G) system. More particularly, the disclosure relates to a method and an apparatus for managing a PDU session if DN authorization information is updated (or changed) at the time of the re-authentication of the PDU session.

2. Description of Related Art

To meet the demand for wireless data traffic having increased since deployment of 4th Generation (4G) communication systems, efforts have been made to develop an improved 5G or pre-5G communication system. Therefore, the 5G or pre-5G communication system is also called a 'Beyond 4G Network' or a 'Post Long Term Evolution (LTE) System'.

The 5G communication system is considered to be implemented in higher frequency millimeter wave (mmWave) bands, e.g., 60 gigahertz (GHz) bands, so as to accomplish higher data rates. To decrease propagation loss of the radio waves and increase the transmission distance, beamforming, massive multiple-input multiple-output (MIMO), Full Dimensional MIMO (FD-MIMO), array antenna, analog beam forming, and large-scale antenna techniques are discussed in 5G communication systems. In addition, in 5G communication systems, development for system network improvement is underway based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like. In the 5G system, Hybrid Frequency-Shift Keying (FSK) and Quadrature Amplitude Modulation (QAM) (FQAM) and sliding window superposition coding (SWSC) as an advanced coding modulation (ACM), and filter bank multi-carrier (FBMC), non-orthogonal multiple access (NOMA), and sparse code multiple access (SCMA) as an advanced access technology, have been developed.

At the same time, the Internet, which is a human centered connectivity network where humans generate and consume information, is also evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine-Type Communication (MTC), and so forth, have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services, through convergence and combination between existing Information Technology (IT) and various industrial applications.

In line with this, various attempts have been made to apply 5G communication systems to IoT networks. For example, technologies such as a sensor network, Machine-Type Communication (MTC), and Machine-to-Machine (M2M) communication, may be implemented by beamforming, MIMO, and array antennas. Application of a cloud Radio Access Network (RAN) as the above-described Big Data processing technology may also be considered to be an example of convergence between the 5G technology and the IoT technology.

A 3rd generation partnership project (3GPP) responsible for a cellular mobile communication standard has named a new core network structure as 5G core (5GC) and is proceeding with standardization of 5G core in order to evolve the 4G LTE system of the related art to a 5G system.

5GC supports a differentiated function below as compared to evolved packet core (EPC), which is a network core for the 4G of the related art.

First, a network slice function is introduced in 5GC. According to the requirements of 5G, 5GC is required to support various types of terminals and services (e.g. enhanced mobile broadband (eMBB)), ultra-reliable low-latency communications (URLLC), and massive machine-type communications (mMTC)). Different requirements are required for a core network by terminals/services described above, respectively. For example, eMBB service may require a high data rate, and URLLC service may require high stability and low latency. A network slice method is the technology proposed to satisfy various service requirements described above. Network slice is a method of virtualizing a single physical network to make several logical networks, and network slice instances (NSI) may have different characteristics. This is because each NSI has a network function (NF) according to the characteristic. Various 5G services can be efficiently supported by allocating NSIs according to the characteristics of services required by terminals.

Second, 5GC can easily support a network virtualization paradigm through separation between a mobility management function and a session management function. In the 4G LTE of the related art, all the terminals were able to be provided with service in a network through signaling exchange with a single core equipment called a mobility management entity (MME) configured to perform registration, authentication, mobility management and session management functions. However, in 5G, the number of terminals has grown explosively, and mobility and traffic/session characteristics required to be supported are subdivided according to the types of terminals. Accordingly, if a single equipment, such as an MME, supports all the functions, scalability indicating the addition of an entity for each required function decreases. Therefore, various functions have been developed based on a structure of separating a mobility management function from a session management function in order to improve scalability in terms of signaling loads and the functions/implementation complexity of core equipment responsible for a control plane.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages describe below. Accordingly, an aspect of the disclosure is to provide a method for supporting extensible authentication protocol (EAP) re-authentication of a PDU session generated through DN authentication/authorization with a DN-AAA server in a 5G system, and a method and an apparatus for managing a corresponding PDU session if DN authorization information is updated at the time of EAP re-authentication.

Additional aspects will be set forth in part in the description which follows and, in part, will be apparent from the description, or may be learned by practice of the presented embodiments.

In accordance with an aspect of the disclosure, a method performed by a first network entity performing a session management function (SMF) is provided. The method includes identifying an initiation of a re-authentication for a protocol data unit (PDU) session, receiving, from a second network entity performing a data network authentication, authorization and accounting (DN-AAA), a data network (DN) authorization profile index for the PDU session, during the re-authentication, and transmitting, to a third network entity performing a policy control function (PCF), a message for requesting a policy control for the PDU session, in case that the received DN authorization profile index changes a DN authorization profile index associated with an authentication for the PDU session, wherein the message includes the received DN authorization profile index.

In accordance with another aspect of the disclosure, a method performed by a second network entity performing a data network authentication, authorization and accounting (DN-AAA) is provided. The method includes identifying an initiation of a re-authentication for a protocol data unit (PDU) session, and transmitting, to a first network entity performing a session management function (SMF), a data network (DN) authorization profile index for the PDU session, during the re-authentication, wherein a message for requesting a policy control for the PDU session is transmitted from the first network entity to a third network entity performing a policy control function (PCF), in case that the transmitted DN authorization profile index changes a DN authorization profile index associated with an authentication for the PDU session, and wherein the message includes the transmitted DN authorization profile index.

In accordance with another aspect of the disclosure, a first network entity performing a session management function (SMF) is provided. The first network entity includes a transceiver, and at least one processor configured to identify an initiation of a re-authentication for a protocol data unit (PDU) session, receive, from a second network entity performing a data network authentication, authorization and accounting (DN-AAA) via the transceiver, a data network (DN) authorization profile index for the PDU session, during the re-authentication, and transmit, to a third network entity performing a policy control function (PCF) via the transceiver, a message for requesting a policy control for the PDU session, in case that the received DN authorization profile index changes a DN authorization profile index associated with an authentication for the PDU session, wherein the message includes the received DN authorization profile index.

In accordance with another aspect of the disclosure, a second network entity performing a data network authentication, authorization and accounting (DN-AAA) is provided. The second network entity includes a transceiver, and at least one processor configured to identify an initiation of a re-authentication for a protocol data unit (PDU) session, and transmit, to a first network entity performing a session management function (SMF) via the transceiver, a data network (DN) authorization profile index for the PDU session, during the re-authentication, wherein a message for requesting a policy control for the PDU session is transmitted from the first network entity to a third network entity performing a policy control function (PCF), in case that the transmitted DN authorization profile index changes a DN authorization profile index associated with an authentication for the PDU session, and wherein the message includes the transmitted DN authorization profile index.

In accordance with another aspect of the disclosure, EAP re-authentication can be performed on a PDU session generated through DN authentication/authorization with a DN-AAA server, whereby the same PDU session can be maintained and the EAP re-authentication can be performed before authentication expiration.

In accordance with another aspect of the disclosure, if DN authorization information or a DN authorization profile is changed during an EAP re-authentication process, a policy relating to a PDU session is modified to enable DN service to be continuously supported through the same PDU session.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
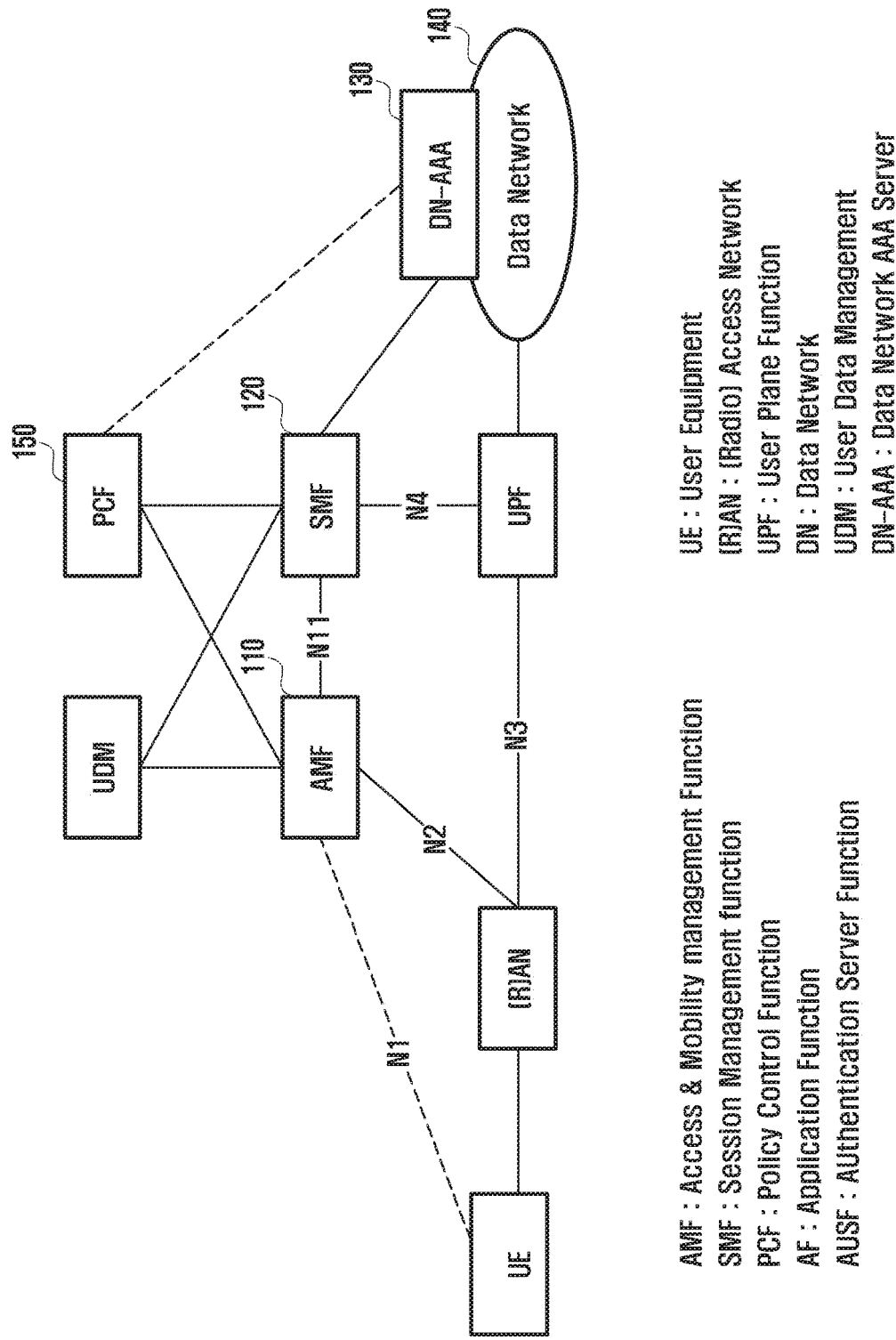
FIG. 1 illustrates a 5G network configuration for supporting DN authorization/authentication of a PDU session according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only, and not for the purpose of limiting the disclosure as defined by the appended claims and their equivalents.

It is to be understood that the singular forms "a," "an," and "the," include plural referents unless the context clearly dictates otherwise. Thus, for example, reference to "a component surface" includes reference to one or more of such surfaces.

Hereinafter, preferred embodiments will be described in detail with reference to the accompanying drawings. Here, it is noted that identical reference numerals denote the same elements in the accompanying drawings. Further, in the following description of the disclosure, a detailed description of known functions and configurations incorporated herein will be omitted when it may make the subject matter of the disclosure unclear.

In describing the embodiments, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly convey the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the following embodiments and may be implemented in various different forms, and the embodiments are provided to make the disclosure comprehensive and completely inform those skilled in the art of the scope of the disclosure and the disclosure is only defined by the scope of the claims. Throughout the specification, the same or like reference numerals designate the same or like elements.

Here, it will be understood that each block of the flowchart illustrations, and combinations of blocks in the flowchart illustrations, can be implemented by non-transitory computer readable program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer-usable or computer-readable memory that can direct a computer or other programmable data processing apparatus to function in a particular manner, such that the instructions stored in the computer-usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable data processing apparatus to produce a computer implemented process such that the instructions that are executed on the computer or other programmable data processing apparatus provide operations for implementing the functions specified in the flowchart block or blocks.

In addition, each block of the flowchart illustrations may represent a module, segment, or portion of code, which includes one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in the reverse order, depending upon the functionality involved.

As used herein, a unit refers to a software element or a hardware element, such as a field programmable gate array (FPGA) or an application specific integrated circuit (ASIC), which performs a predetermined function. However, a unit does not always have a meaning limited to software or hardware. A unit may be constructed either to be stored in an addressable storage medium or to execute one or more processors. Therefore, a unit includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. Functions provided by the elements and units may be either combined into a smaller number of elements and units, or divided into a larger number of additional elements and units. Moreover, the elements and units may be implemented to reproduce one or more central processing units (CPUs) within a device or a security multimedia card.

Hereinafter, a base station is a subject functioning to allocate resources for a terminal, and may be at least one of an eNode B, a gNode B, a gNB, an eNB, a Node B, a base station (BS), a radio access network (RAN), an access network (AN), a RAN node, a radio access unit, a base station controller or processor, a transmission and reception point (TRP), or a node in network. A terminal may include a user equipment (UE), a mobile station (MS), a cellular phone, a smartphone, a computer, or a multimedia system capable of a communication function. In the disclosure, a downlink (DL) means a wireless transmission path through which a base station transmits a signal to a terminal, and an uplink (UL) means a wireless transmission path through which a terminal transmits a signal to a base station. In addition, hereinafter, an embodiment will be described based on an example of LTE, LTE-advanced (LTE-A), or a new radio (NR) system, but embodiments may be also applied to other communication systems having similar technical backgrounds or channel types. In addition, embodiments may be also applied to another communication systems through partial modification without departing from the scope of the disclosure according to the determination of a person skilled in the art.

FIG. 1 illustrates a network configuration for supporting DN authorization/authentication of a PDU session in a 5G system according to an embodiment of the disclosure.

Referring to FIG. 1, an access and mobility management function (AMF) 110 of managing mobility and network registration of a terminal and a session management function (SMF) 120 of managing an end-to-end session may be separated from each other in a network architecture for a 5G system, and the AMF 110 and the SMF 120 may exchange signaling through an N11 interface. A User Equipment (UE) and Radio Access Network RAN may exchange signaling with the AMF 110 through an N1 and N2 interface. A User Plane Function (UPF) may exchange signaling with the SMF 120 through an N4 interface. The RAN and UPF may exchange signaling through an N3 interface.

A 5G system corresponds to a connection for a terminal to access a data network 140, and may assign an IP address or an IP prefix to the terminal through the SMF 120 of managing a session of the terminal in a session connection process if the data network is an Internet protocol (IP) network.

As an entity supporting DN authorization/authentication for a PDU session, a DN-AAA server 130 configured to perform authentication for session access of a terminal to a particular DN exists. The DN-AAA server previously shares, with the SMF 120 or a policy control function (PCF) 150, DN authorization data including policy and charging control information to be provided from a corresponding DN and/or information of a DN authorization profile index indicating the DN authorization data.

According to an embodiment, a terminal performs a procedure of: from provisioned information, determining to have an authority for using a service of a particular DN; performing session authentication for the DN; and generating a PDU session to use the service.

The procedure described above may include a detailed procedure as described below.

if the terminal determines, through provisioned information, that a service of a particular DN is usable, the terminal requests generation of a PDU session by using a corresponding data network name (DNN);

if a network (e.g. SMF) recognizes that session authentication for the DNN proposed by the terminal is separately needed according to a local policy, the network searches for a session authentication server (i.e. DN-AAA server);

if authentication between the terminal and the DN-AAA server is successful, the SMF receives DN authorization data of the terminal from the DN-AAA server, and the DN authorization data includes a DN authorization profile index;

if dynamic policy and charging control (PCC) is not applied, the SMF may identify policy information and charging control information corresponding to the received DN authorization profile index through the relationship between the DN authorization profile index and the policy information and charging control information, previously shared by the SMF with the DN-AAA server;

if the dynamic policy and charging control is applied, the SMF transfers the received DN authorization profile index to the PCF. The PCF obtains the policy information and charging control information corresponding to the received DN authorization profile index through the relationship between the DN authorization profile index and the policy information and charging control information, previously shared by the PCF with the DN-AAA server, and transfers the policy information and charging control information corresponding to the DN authorization profile index to the SMF; and the terminal having succeeded in session authentication obtains information required for session access, including an IP address.

Before the authentication with the DN-AAA server expires, the terminal, the SMF, or the DN-AAA server may perform re-authentication between the terminal and the DN-AAA server.

For example, the terminal may trigger a re-authentication procedure in order to extend the authentication with the DN-AAA server before the authentication expires. In addition, the terminal may trigger re-authentication if a serving SMF of a corresponding PDU session is changed. In addition, the SMF or DN-AAA server instead of the terminal may trigger re-authentication in order to extend the authentication before the expiration of the authentication. In addition, if the DN-AAA server changes the DN authentication data or DN authorization profile, the DN-AAA server may trigger re-authentication in order to update the corresponding information in the SMF and the PDU session.

Figure 2:
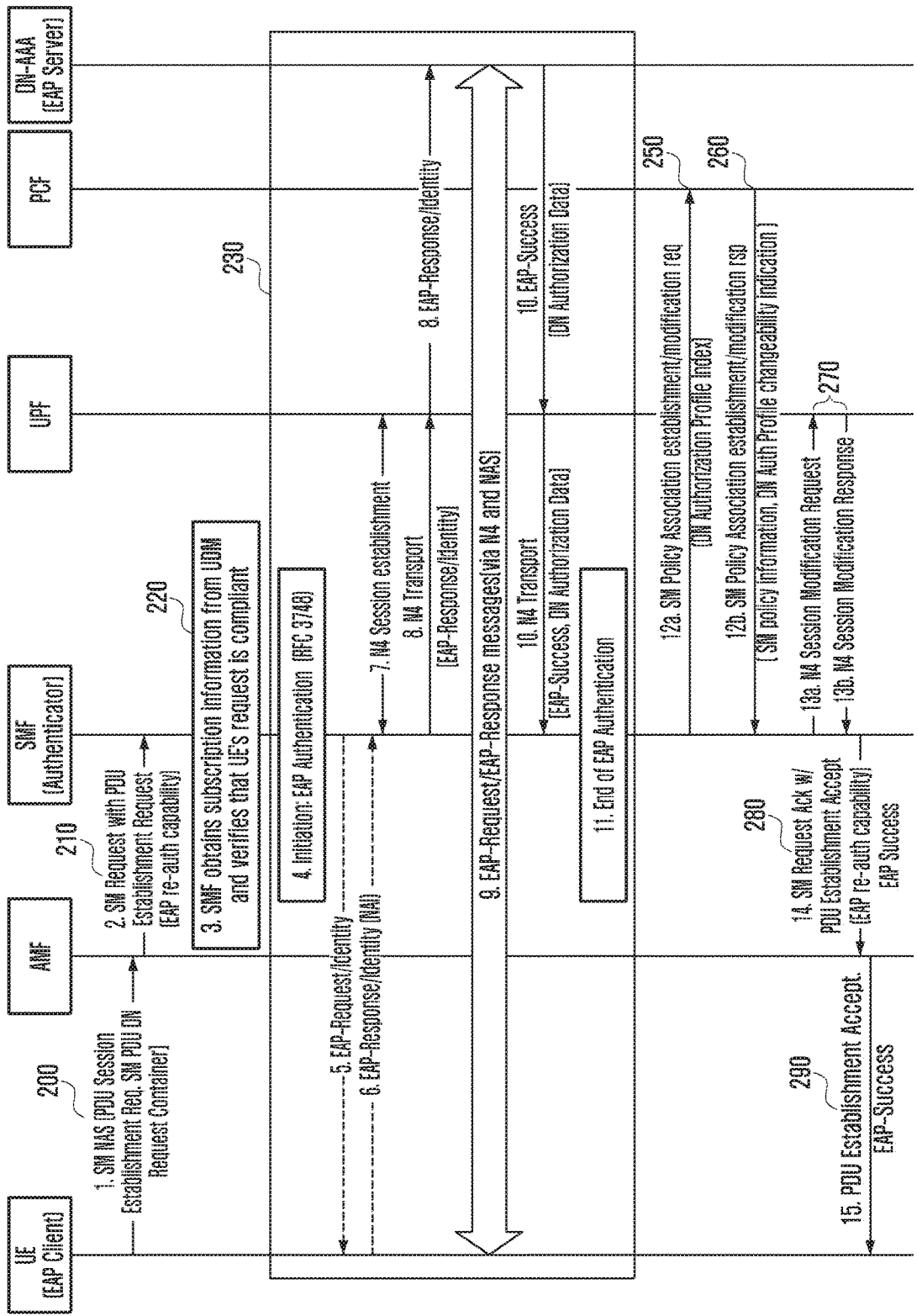
FIG. 2 is a signal flow diagram illustrating a session generation and authentication procedure according to an embodiment of the disclosure.

FIG. 2 is a signal flow diagram illustrating a session generation and authentication procedure according to an embodiment of the disclosure.

Referring to FIG. 2, a procedure in which a terminal generates a PDU session and performs session authentication for a corresponding DN according to an embodiment will be described.

A terminal performs EAP authentication through provisioned authentication information. After successful authentication, an authentication server (e.g. DN-AAA server) transfers DN authorization data to an SMF. A process described above is performed through a procedure as illustrated in FIG. 2.

At the time of generation of a PDU session in 1 of operation 200 of FIG. 2, SM NAS signaling transmitted by the terminal (UE) includes DNN information indicating a serviced DN, which the terminal is to use. In addition, an AMF having received the signaling of the terminal may notify the SMF of whether the terminal supports an EAP re-authentication scheme of RFC6696, through EAP re-authentication capability in 2 of operation 210.

In 3 of operation 220, the SMF recognizes that DN authorization/authentication of a corresponding DNN is required, and the SMF performs EAP authentication in 4-11 of operation 230.

In 6, the terminal transfers ID information provisioned in the terminal, to the SMF. In 8, the SMF searches for a DN-AAA server, based on information included in an ID of the received information. The SMF searches for a DN-AAA server according to configuration data stored in the SMF.

If the DN-AAA server is in a 5G system, 7 is omitted, and the SMF directly exchanges an EAP message with the DN-AAA server without going through a UPF in 8-10.

In 9, an EAP authentication procedure is performed between the terminal (UE), the SMF, and the DN-AAA server. In 10, if EAP authentication is successful, the DN-AAA server transfers DN authorization data together with an EAP-Success message to the SMF. The DN authorization data may include a DN authorization profile index to be used in a process of obtaining policy information and charging control information by the SMF.

In a case where dynamic PCC is applied, in 12a of operation 250, if the SMF transfers a DN authorization profile index to a PCF in a process of requesting, for a corresponding PDU session, the PCF to generate an SM policy association or modify an existing SM policy association, the PCF maps SM policy and charging control information corresponding to the DN authorization profile index to a corresponding SM policy association of the PDU session and transfers the SM policy and charging control information to the SMF in 12b of operation 260. The PCF may also transfer, to the SMF, the information together with a DN authorization profile changeability indication indicating whether a DN authorization profile of the PDU session can be modified. In an EAP re-authentication process of another embodiment, in the case where the SMF determines that the DN authorization profile is modifiable, if the DN authorization profile index is changed, the SMF requests the PCF to modify the SM policy association. However, in the case where the DN authorization profile is determined to be unmodifiable from the DN authorization profile changeability indication, even if the DN authorization profile index is changed in the EAP re-authentication process, the SMF does not request the PCF to modify the SM policy association.

The SMF having obtained the SM policy and charging control information of the PDU session updates an N4 session between the SMF and the UPF in 13a and 13b of operation 270. If 7 is omitted so that the N4 session does not exist, the SMF generates an N4 session with the UPF according to the obtained SM policy and charging control information instead of using 13a and 13b.

In 14 of operation 260 and 15 of operation 290, the SMF notifies the terminal through the AMF that the PDU session is successfully generated for the DN. In addition, the SMF may notify the terminal of whether the serving SMF supports an EAP re-authentication scheme of RFC6696, through EAP re-authentication capability. The SMF may notify the terminal of whether an EAP re-authentication scheme can be used for the generated session, in consideration of the capability of the serving SMF and EAP re-authentication capability transmitted by the terminal. If EAP re-authentication is not supported, the SMF performs re-authentication by using an EAP authentication scheme of RFC3748 in the case where the re-authentication is needed.

Figure 3:
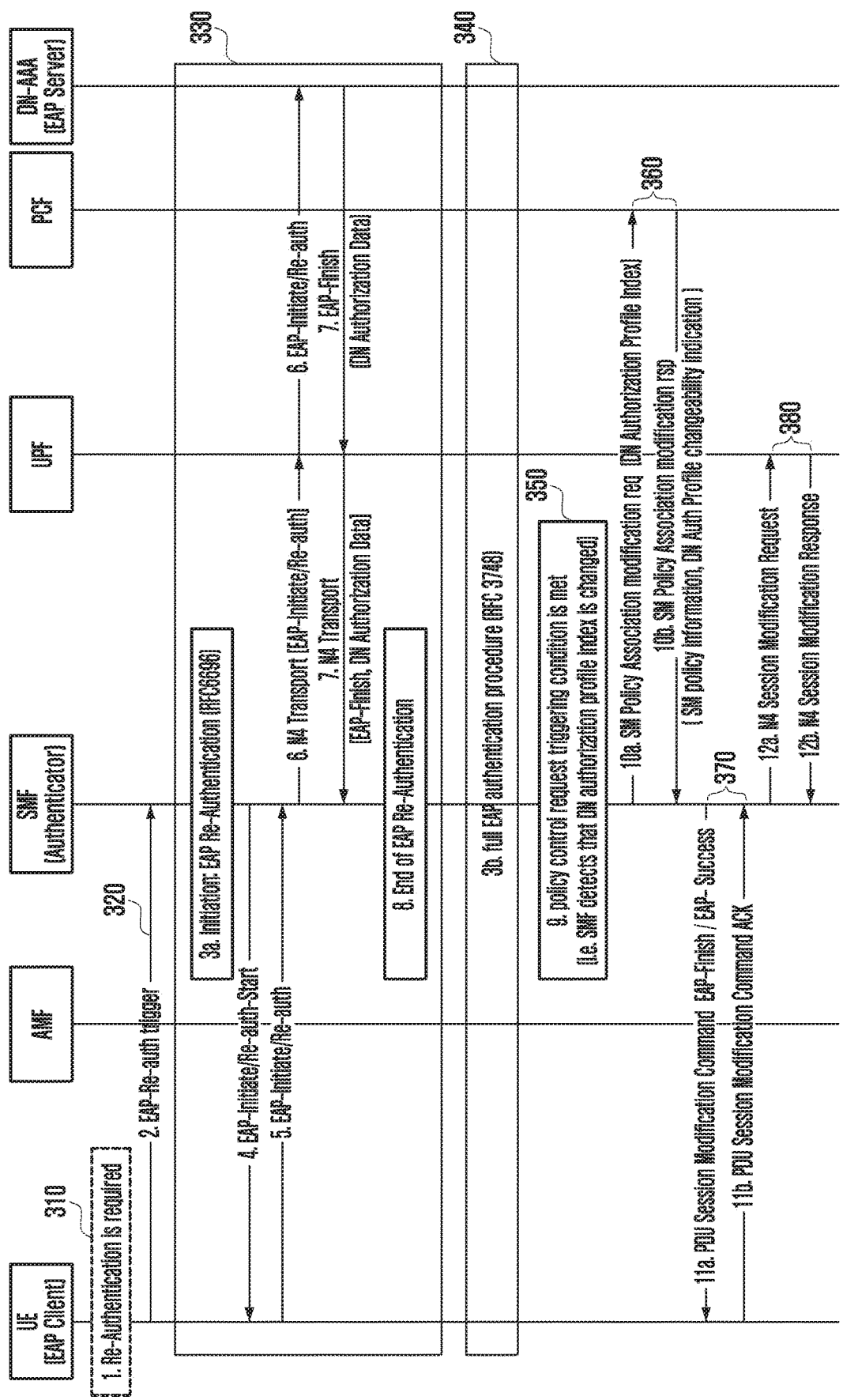
FIG. 3 is a signal flow diagram illustrating a session re-authentication procedure triggered by a terminal according to an embodiment of the disclosure.

FIG. 3 is a signal flow diagram illustrating a session re-authentication procedure triggered by a terminal according to an embodiment of the disclosure. According to an embodiment, a procedure in which a terminal triggers re-authentication of a DN-authorized PDU session with a corresponding DN-AAA server will be described. The procedure is performed through a procedure as illustrated in FIG. 3.

Referring to FIG. 3, in 1 of operation 310 of FIG. 3, the terminal (UE) determines that re-authentication and/or re-authorization of a session is required. For example, before an authentication period of a DN-authorized PDU session expires; if an input of indicating that re-authentication is required, re-authorization is required, or if an input indicating re-authentication and re-authorization are required is received through an application layer from the DN-AAA server; or if the terminal or a user selects a separate subscription in an application layer or desires to change a subscription, the terminal determines that re-authentication and/or re-authorization of the PDU session is required.

In 2 of operation 320, the terminal transmits an EAP Re-auth trigger message to the SMF in order to notify the SMF that re-authentication/re-authorization of the PDU session is required. The EAP Re-auth trigger message is transmitted to the SMF after being included in an SM NAS transport message.

The SMF performs 3a and 4-8 of operation 330 according to whether RFC6696 EAP re-authentication is supported, or performs EAP authentication of RFC3748 as in 3b of operation 340 if EAP re-authentication of RFC6696 is not supported. The EAP authentication of 3b follows those of 4-11 in FIG. 2.

In the case of EAP re-authentication of RFC6696, the SMF transfers an EAP-Initiate/Re-auth-Start message to the terminal in 4, and an EAP-Initiate/RE-auth message is transferred through the SMF from the terminal to the DN-AAA server in 5 and 6.

In 7, if EAP re-authentication is successful, the DN-AAA server transfers DN authorization data together with an EAP-finish message to the SMF. The DN authorization data may include a DN authorization profile index for obtaining policy information and charging control information by the SMF.

In 9 of operation 350, the SMF determines that a policy control request triggering condition is satisfied. For example, if a DN authorization profile index newly received by the SMF from the DN-AAA server is different from an existing value received for the PDU session; or if a DN authorization profile index newly received from the DN-AAA server is different from an existing value received for the PDU session, and the SMF recognizes that a DN authorization profile index is changeable, from an existing DN authorization changeability indication received from the PCF, the SMF determines that a triggering condition for a policy control request is satisfied.

In a case where dynamic PCC is applied, the SMF transfers a DN authorization profile index newly received from the DN-AAA server, to the PCF through an SM policy association modification process as in 10a and 10b of operation 360, and the PCF maps SM policy and charging control information corresponding to the newly received DN authorization profile index with respect to the PDU session, to an SM policy association of the PDU session and transfers the SM policy and charging control information to the SMF. The PCF may also transfer, to the SMF, the information together with a DN authorization profile changeability indication indicating whether a DN authorization profile of the PDU session can be modified. In the case where the DN authorization profile is determined to be modifiable in the remaining EAP re-authentication process to be performed, if the DN authorization profile index is changed, the SMF requests the PCF to modify the SM policy association. However, in the case where the DN authorization profile is determined to be unmodifiable from the DN authorization profile changeability indication, even if the DN authorization profile index is changed in the EAP re-authentication process, the SMF does not request the PCF to modify the SM policy association.

The SMF having obtained the SM policy and charging control information of the PDU session notifies the terminal through an EAP-finish or an EAP-Success that the DN has been reauthenticated successfully, and transfers a PDU session modification command message to the terminal through the AMF so that the PDU session is modified, in 11a and 11b of operation 370. In 12a and 12b of operation 380, the SMF updates the N4 session between the UPF and the SMF.

Figure 4:
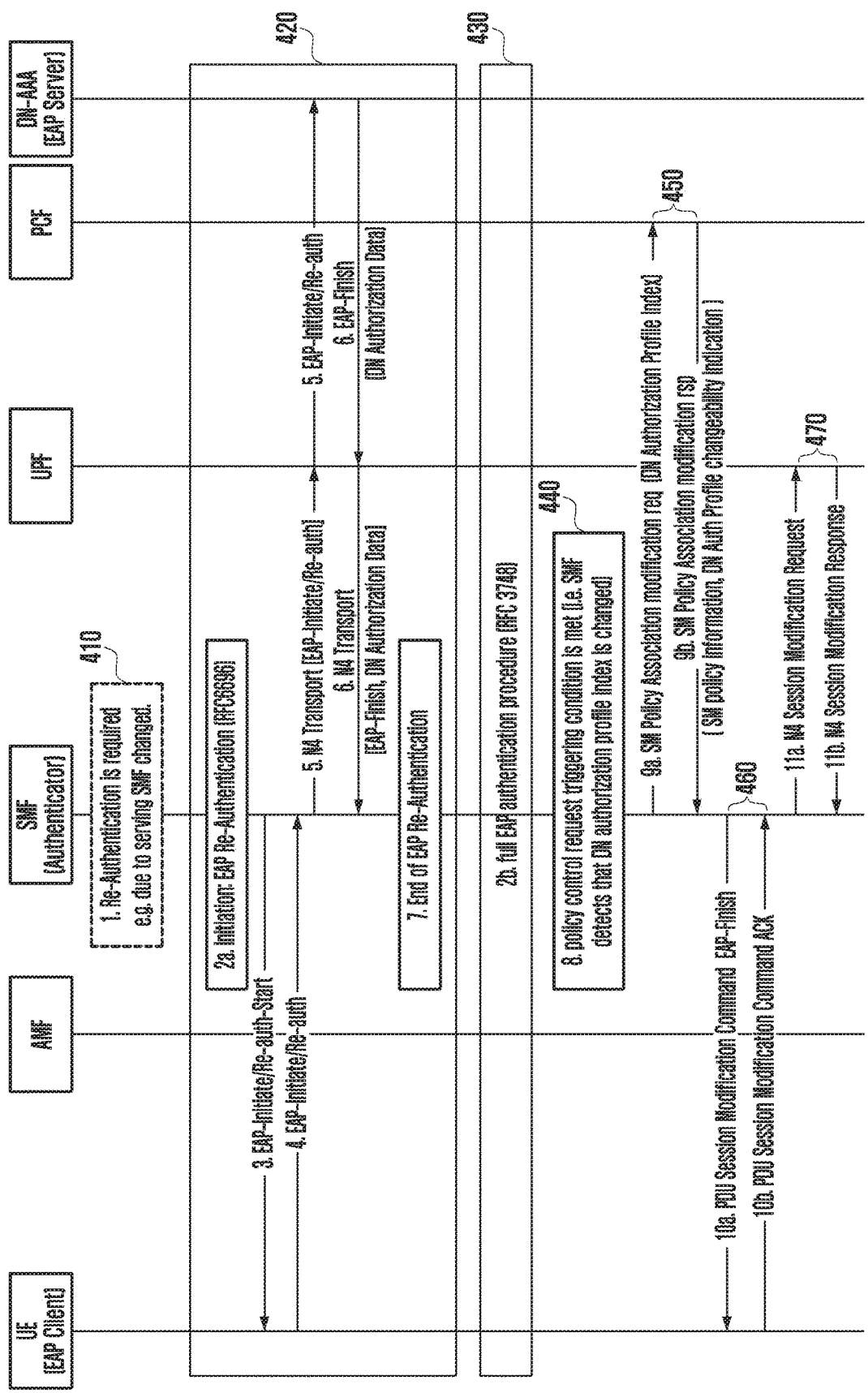
FIG. 4 is a signal flow diagram illustrating a session re-authentication procedure triggered by a session management function (SMF) according to an embodiment of the disclosure.

FIG. 4 is a signal flow diagram illustrating a session re-authentication procedure triggered by an SMF according to an embodiment of the disclosure. FIG. 4 illustrates a procedure in which an SMF triggers re-authentication of a DN-authorized PDU session with a DN-AAA server according to an embodiment. The procedure is performed through a procedure as illustrated in FIG. 4.

Referring to FIG. 4, in 1 of operation 410 of FIG. 4, the SMF determines that re-authentication and/or re-authorization of a session is required. For example, before an authentication period of a DN-authorized PDU session expires; or if a serving SMF/authenticator of the PDU session is changed, the SMF determines that re-authentication and/or re-authorization of the PDU session is required.

The SMF performs 2a and 3-7 of operation 420 according to whether EAP re-authentication of RFC6696 is supported, or performs EAP authentication of RFC3748 as in 2b of operation 430 if EAP re-authentication of RFC6696 is not supported. The EAP authentication of 2b follows those of 4-11 in FIG. 2.

In the case of EAP re-authentication of RFC6696, the SMF transfers an EAP-Initiate/Re-auth-Start message to the terminal in 3, and the EAP-Initiate/RE-auth-Start message is transferred through the SMF from the terminal to the DN-AAA server in 4 and 5.

In 6, if EAP re-authentication is successful, the DN-AAA server transfers DN authorization data together with an EAP-finish message to the SMF. The DN authorization data may include a DN authorization profile index such that the SMF can obtain policy information and charging control information.

In 8 of operation 440, the SMF determines that a policy control request triggering condition is satisfied. For example, if a DN authorization profile index newly received by the SMF from the DN-AAA server is different from an existing value received for the PDU session; or if a DN authorization profile index newly received from the DN-AAA server is different from an existing value received for the PDU session, and the SMF recognizes that a DN authorization profile index is changeable, from an existing DN authorization changeability indication received from the PCF, the SMF determines that a triggering condition for a policy control request is satisfied.

In a case where dynamic PCC is applied, the SMF transfers a DN authorization profile index newly received from the DN-AAA server, to the PCF through an SM policy association modification process as in 9a and 9b of operation 450, and the PCF maps SM policy and charging control information corresponding to the newly received DN authorization profile index with respect to the PDU session, to an SM policy association of the PDU session and transfers the SM policy and charging control information to the SMF. The PCF may also transfer, to the SMF, the information together with a DN authorization profile changeability indication indicating whether a DN authorization profile of the PDU session can be modified. In the case where the DN authorization profile is determined to be modifiable in the remaining EAP re-authentication process to be performed, if the DN authorization profile index is changed, the SMF requests the PCF to modify the SM policy association. However, in the case where the DN authorization profile is determined to be unmodifiable from the DN authorization profile changeability indication, even if the DN authorization profile index is changed in the EAP re-authentication process, the SMF does not request the PCF to modify the SM policy association.

The SMF having obtained the SM policy and charging control information of the PDU session notifies the terminal through an EAP-finish or an EAP-Success that the DN has been reauthenticated successfully, and transfers a PDU session modification command message to the terminal through the AMF so that the PDU session is modified in 10a and 10b of operation 460. In 11a and 11b of operation 470, the SMF updates the N4 session between the UPF and the SMF.

Figure 5:
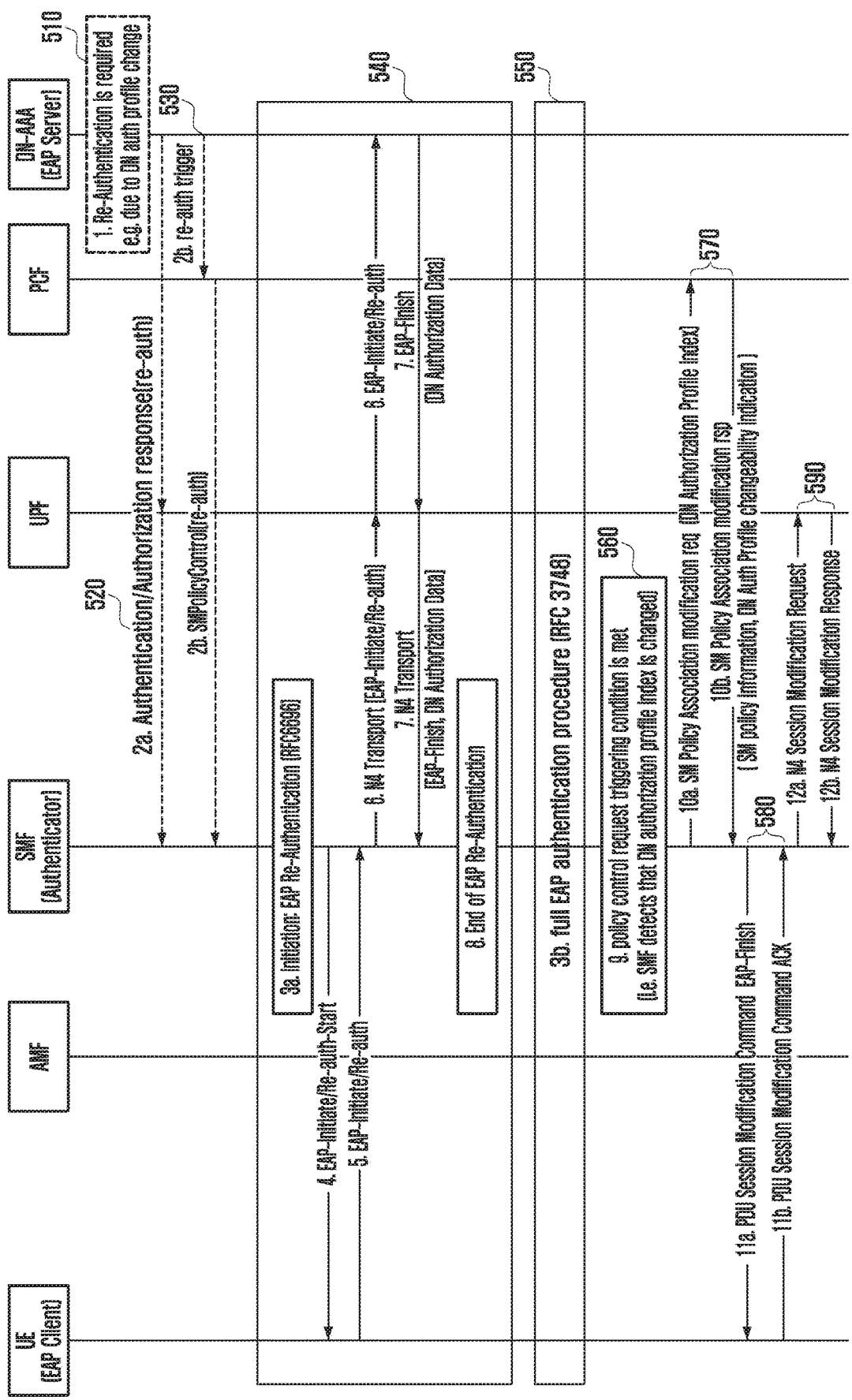
FIG. 5 is a signal flow diagram illustrating a session re-authentication procedure triggered by a DN-AAA server according to an embodiment of the disclosure.

FIG. 5 is a signal flow diagram illustrating a session re-authentication procedure triggered by a DN-AAA server according to an embodiment of the disclosure. According to an embodiment, a procedure in which a DN-AAA server triggers re-authentication of a DN-authorized PDU session for a corresponding DN will be described. The procedure is performed through a procedure as illustrated in FIG. 5.

Referring to FIG. 5, in 1 of operation 510 of FIG. 5, the DN-AAA server determines that re-authentication and/or re-authorization of a session is required. For example, before an authentication period of a DN-authorized PDU session expires; new re-authorization is required as DN authorization data is changed in the DN-AAA server; or if re-authentication, re-authorization, or re-authentication and re-authorization with the terminal are required due to change of a policy, the DN-AAA server determines that re-authentication and/or re-authorization of the PDU session is required.

In 2a of operation 520, in order to notify the SMF that re-authentication/re-authorization is required for the PDU session, the DN-AAA server may directly transmit an authentication/authorization response message according to a method of directly notifying the SMF, or select a method of triggering re-authentication through the PCF as in 2b of operation 530.

First, in the method of 2a, the DN-AAA server transmits an authentication/authorization response message to the SMF. The authentication/authorization response message may indicate that only re-authorization is required, only re-authentication is required, or both re-authentication and re-authorization are required. If only re-authorization is required, the authentication/authorization response message may include a new DN authorization profile index. In this case, the EAP (re-)authentication process as in 3a and 4-8 of operation 540 or 3b of operation 550 is skipped.

In the method of 2b, the DN-AAA server transmits a re-authentication/re-authorization triggering message to the PCF. The re-authentication/re-authorization triggering message may be transferred through service flow information modification.

The re-authentication/re-authorization triggering message may indicate that only re-authorization is required, only re-authentication is required, or both re-authentication and re-authorization are required. If only re-authorization is required, the re-authentication/re-authorization triggering message may include a new DN authorization profile index. In this case, the EAP (re-)authentication process as in 3a and 4-8 or 3b and the SM policy updating process as in 9 of operation 560 and 10a and 10b of operation 570 are skipped.

The PCF having received the re-authentication/re-authorization triggering message notifies the SMF through an SM policy control message that re-authentication or re-authorization is required for the PDU session in 2b of operation 530. If re-authorization is required, the message may include a new DN authorization profile index value, and accordingly, the SMF performs a PDU session modification procedure as in 11a and 11b of operation 580 and 12a and 12b of operation 590.

The SMF having recognized that EAP re-authentication is required, through 2, performs 3a and 4-8 according to whether EAP re-authentication of RFC6696 is supported, or performs EAP authentication of RFC3748 as in 3b if EAP re-authentication of RFC6696 is not supported. The EAP authentication of 3b follows those of 4-11 in FIG. 2.

In the case of EAP re-authentication of RFC6696, the SMF transfers an EAP-Initiate/Re-auth-Start message to the terminal in 4, and an EAP-Initiate/RE-auth-Start message is transferred through the SMF from the terminal to the DN-AAA server in 5 and 6.

In 7, if EAP authentication is successful, the DN-AAA server transfers DN authorization data together with an EAP-finish message to the SMF. The DN authorization data may include a DN authorization profile index such that the SMF can obtain policy information and charging control information.

In 9, the SMF determines that a policy control request triggering condition is satisfied. For example, if a DN authorization profile index newly received by the SMF from the DN-AAA server is different from an existing value received for the PDU session; or if a DN authorization profile index newly received from the DN-AAA server is different from an existing value received for the PDU session, and the SMF recognizes that a DN authorization profile index is changeable, from an existing DN authorization changeability indication received from the PCF, the SMF determines that a triggering condition for a policy control request is satisfied.

In a case where dynamic PCC is applied, the SMF transfers a DN authorization profile index newly received from the DN-AAA server, to the PCF through an SM policy association modification process as in 10a and 10b, and the PCF maps SM policy and charging control information corresponding to the newly received DN authorization profile index with respect to the PDU session, to an SM policy association of the PDU session and transfers the SM policy and charging control information to the SMF. The PCF may also transfer, to the SMF, the information together with a DN authorization profile changeability indication indicating whether a DN authorization profile of the PDU session can be modified. In the case where the DN authorization profile is determined to be modifiable in the remaining EAP re-authentication process to be performed, if the DN authorization profile index is changed, the SMF requests the PCF to modify the SM policy association. However, in the case where the DN authorization profile is determined to be unmodifiable from the DN authorization profile changeability indication, even if the DN authorization profile index is changed in the EAP re-authentication process, the SMF does not request the PCF to modify the SM policy association.

The SMF having obtained the SM policy and charging control information of the PDU session notifies the terminal through an EAP-finish or an EAP-Success that the DN has been reauthenticated successfully, and transfers a PDU session modification command message to the terminal through the AMF so that the PDU session is modified in 11a and 11b. In 12a and 12b, the SMF updates the N4 session between the UPF and the SMF.

Figure 6:
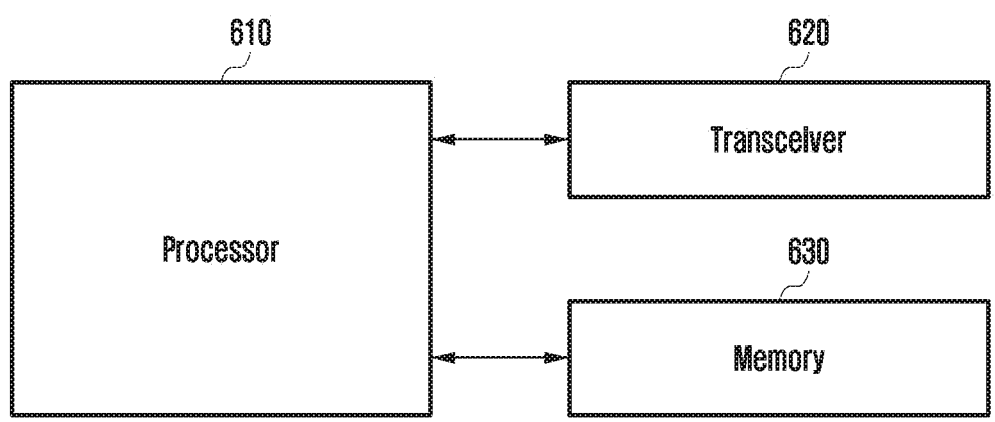
FIG. 6 illustrates a configuration of a terminal according to an embodiment of the disclosure.

FIG. 6 illustrates a configuration of a terminal according to an embodiment of the disclosure.

Referring to FIG. 6, a terminal may include a transceiver 620, a processor 610, and a memory 630. In the disclosure, the processor 610 may be defined as a circuit, an application-specific integrated circuit, or at least one processor, and may be implemented such that at least one processor includes a controller.

The transceiver 620 may transmit or receive a signal to or from another network entity. The transceiver 620 may, for example, receive a downlink signal from a base station and transmit an uplink signal to the base station and may exchange a signal with a network entity in a core network.

The processor 610 may control overall operations of the terminal according to an embodiment proposed in the disclosure. For example, the processor 610 may control a signal flow between the blocks to perform operations according to the drawings and the flowcharts illustrated above.

The memory 630 may store at least one of information transmitted or received through the transceiver 620 and information generated through the processor 610.

Figure 7:
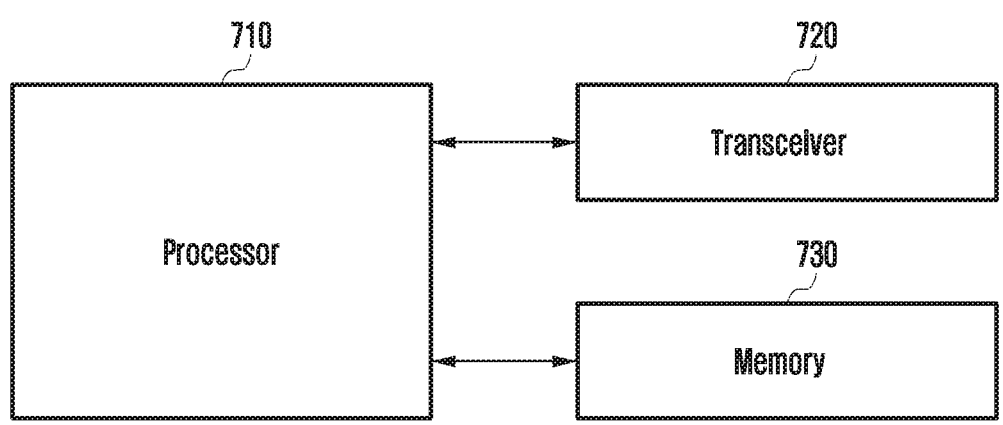
FIG. 7 illustrates a configuration of a base station according to an embodiment of the disclosure.

FIG. 7 illustrates a configuration of a base station according to an embodiment of the disclosure.

Referring to FIG. 7, a base station may include a transceiver 720, a processor 710, and a memory 730. In the disclosure, the processor 710 may be defined as a circuit, an application-specific integrated circuit, or at least one processor, and may be implemented such that at least one processor includes a controller.

The transceiver 720 may transmit or receive a signal to or from another network entity. The transceiver 720 may, for example, transmit a downlink signal to a terminal and receive an uplink signal from the terminal and may exchange a signal with a network entity in a core network.

The processor 710 may control overall operations of a base station according to an embodiment proposed in the disclosure. For example, the processor 710 may control a signal flow between the blocks to perform operations according to the drawings and the flow charts illustrated above.

The memory 730 may store at least one of information transmitted or received through the transceiver and information generated through the processor.

Figure 8:
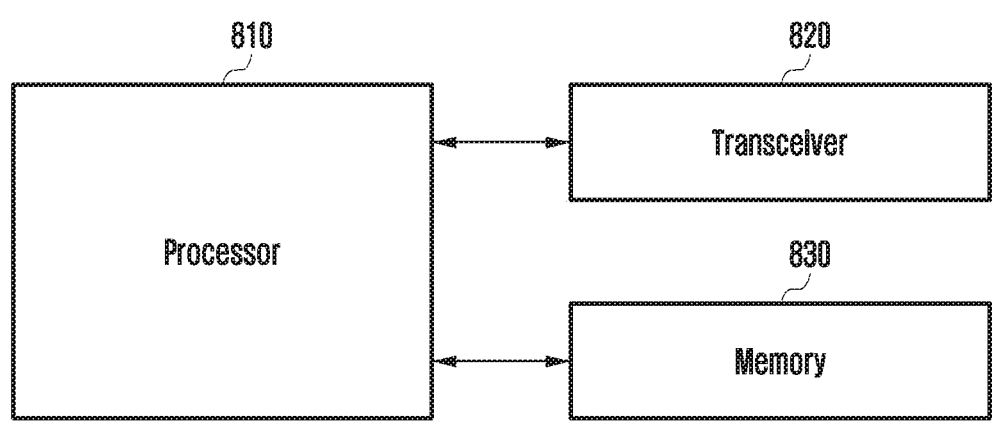
FIG. 8 illustrates a configuration of a network entity according to an embodiment of the disclosure.

FIG. 8 illustrates a configuration of a network entity according to an embodiment of the disclosure.

Referring to FIG. 8, a network entity may include a transceiver 820, a processor 810, and a memory 830. The network entity in FIG. 8 may be a network entity of a 5G core network, and for example, may be an SMF or a DN-AAA server.

In the disclosure, the processor 810 may be defined as a circuit, an application-specific integrated circuit, or at least one processor, and may be implemented such that at least one processor includes a controller.

The transceiver 820 may transmit or receive a signal to or from another network entity. The transceiver 820 may, for example, exchange a signal with a terminal, a base station, or a network entity of another core network.

The processor 810 may control overall operations of a network entity according to an embodiment proposed in the disclosure. For example, the processor 810 may control a signal flow between the blocks to perform operations according to the drawings and the flowcharts illustrated above.

The memory 830 may store at least one of information transmitted or received through the transceiver and information generated through the processor.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. A method performed by a first network entity performing a session management function (SMF) in a communication system, the method comprising:
identifying an initiation of a re-authentication for a protocol data unit (PDU) session;
receiving, from a second network entity performing a data network (DN) authentication, authorization and accounting (DN-AAA), a DN authorization profile index for the PDU session, during the re-authentication; and
transmitting, to a third network entity performing a policy control function (PCF), the received DN authorization profile index, in case that the received DN authorization profile index has changed from a DN authorization profile index associated with an authentication for the PDU session.

2. The method of claim 1, further comprising:
receiving, from the third network entity, policy information for the PDU session; and
applying the policy information for the PDU session.

3. The method of claim 1, further comprising:
transmitting, to a terminal associated with the PDU session, an extensible authentication protocol (EAP) success message notifying a success of the re-authentication.

4. The method of claim 1, wherein the re-authentication is a secondary re-authentication for the PDU session.

5. The method of claim 1, wherein the re-authentication for the PDU session is initiated by the first network entity or the second network entity.

6. A method performed by a second network entity performing a data network (DN) authentication, authorization and accounting (DN-AAA) in a communication system, the method comprising:
identifying an initiation of a re-authentication for a protocol data unit (PDU) session; and
transmitting, to a first network entity performing a session management function (SMF), a DN authorization profile index for the PDU session, during the re-authentication,
wherein the DN authorization profile index is transmitted from the first network entity to a third network entity performing a policy control function (PCF), in case that the transmitted DN authorization profile index has changed from a DN authorization profile index associated with an authentication for the PDU session.

7. The method of claim 6,
wherein policy information for the PDU session is transmitted from the third network entity to the first network entity, and
wherein the policy information is applied by the first network entity for the PDU session.

8. The method of claim 6, wherein an extensible authentication protocol (EAP) success message notifying a success of the re-authentication is transmitted from the first network entity to a terminal associated with the PDU session.

9. The method of claim 6, wherein the re-authentication is a secondary re-authentication for the PDU session.

10. The method of claim 6, wherein the re-authentication for the PDU session is initiated by the first network entity or the second network entity.

11. A first network entity performing a session management function (SMF) in a communication system, the first network entity comprising:
a transceiver; and
a controller configured to:
identify an initiation of a re-authentication for a protocol data unit (PDU) session,
receive, from a second network entity performing a data network (DN) authentication, authorization and accounting (DN-AAA) via the transceiver, a DN authorization profile index for the PDU session, during the re-authentication, and
transmit, to a third network entity performing a policy control function (PCF) via the transceiver, the received DN authorization profile index, in case that the received DN authorization profile index has changed from a DN authorization profile index associated with an authentication for the PDU session.

12. The first network entity of claim 11, wherein the controller is further configured to:
receive, from the third network entity via the transceiver, policy information for the PDU session, and
apply the policy information for the PDU session.

13. The first network entity of claim 11, wherein the controller is further configured to:
transmit, to a terminal associated with the PDU session, an extensible authentication protocol (EAP) success message notifying a success of the re-authentication.

14. The first network entity of claim 11, wherein the re-authentication is a secondary re-authentication for the PDU session.

15. The first network entity of claim 11, wherein the re-authentication for the PDU session is initiated by the first network entity or the second network entity.

16. A second network entity performing a data network (DN) authentication, authorization and accounting (DN-AAA) in a communication system, the second network entity comprising:
a transceiver; and
a controller configured to:
identify an initiation of a re-authentication for a protocol data unit (PDU) session, and
transmit, to a first network entity performing a session management function (SMF) via the transceiver, a DN authorization profile index for the PDU session, during the re-authentication,
wherein the DN authorization profile index is transmitted from the first network entity to a third network entity performing a policy control function (PCF), in case that the transmitted DN authorization profile index has changed from a DN authorization profile index associated with an authentication for the PDU session.

17. The second network entity of claim 16,
wherein policy information for the PDU session is transmitted from the third network entity to the first network entity, and
wherein the policy information is applied by the first network entity for the PDU session.

18. The second network entity of claim 16, wherein an extensible authentication protocol (EAP) success message notifying a success of the re-authentication is transmitted from the first network entity to a terminal associated with the PDU session.

19. The second network entity of claim 16, wherein the re-authentication is a secondary re-authentication for the PDU session.

20. The second network entity of claim 16, wherein the re-authentication for the PDU session is initiated by the first network entity or the second network entity.

21. The method of claim 10, further comprising:
   transmitting, to the first network entity, a message for requesting the re-authentication, based on the re-authentication for the PDU session being initiated by the second network entity.

22. The second network entity of claim 20, wherein the controller is further configured to:
   transmit, to the first network entity, a message for requesting the re-authentication, based on the re-authentication for the PDU session being initiated by the second network entity.

* * * * *